L. W. MUSSER.
EDUCATIONAL APPLIANCE.
APPLICATION FILED MAY 29, 1919.
1,335,126.   Patented Mar. 30, 1920.
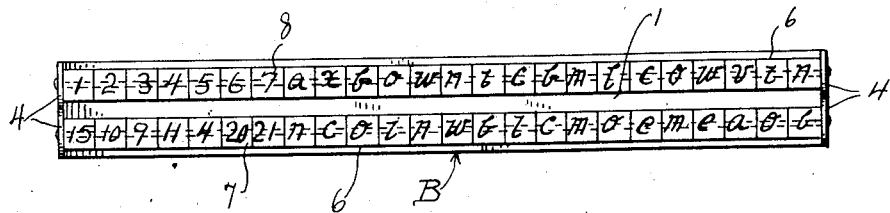
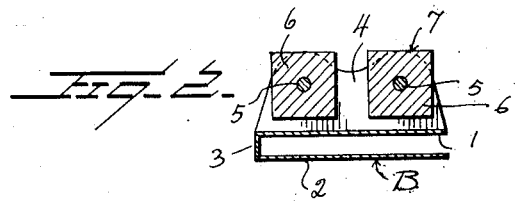
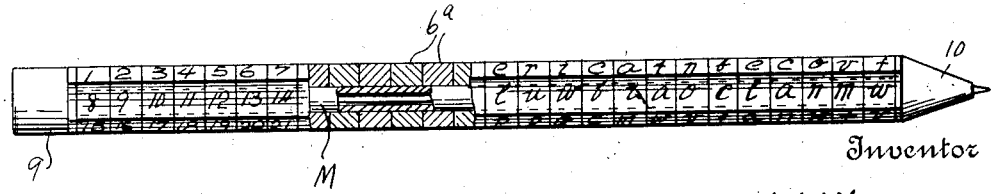
Inventor
L. W. Musser
By Watson E. Coleman
Attorney

UNITED STATES PATENT OFFICE.

LUTHER W. MUSSER, OF STATE COLLEGE, PENNSYLVANIA.

EDUCATIONAL APPLIANCE.

1,335,126. Specification of Letters Patent. Patented Mar. 30, 1920.

Application filed May 29, 1919. Serial No. 300,506.

*To all whom it may concern:*

Be it known that I, LUTHER W. MUSSER, a citizen of the United States, residing at State College, in the county of Center and State of Pennsylvania, have invented certain new and useful Improvements in Educational Appliances, of which the following is a specification, reference being had to the accompanying drawings.

This invention relates to certain improvements in educational appliances, and has relation more particularly to an appliance of this general character especially designed and adapted for use by children or others in connection with primary or elementary study, and it is an object of the invention to provide a novel and improved appliance of this type comprising a plurality of members supported for rotation one independently of the others and wherein the peripheral faces of said members are provided with symbols of a character whereby development of the mind may be accomplished and whereby the device may be employed in a manner to afford a source of amusement.

The invention consists in the details of construction and in the combination and arrangement of the several parts of my improved educational appliance whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in top plan of an educational appliance constructed in accordance with an embodiment of my invention.

Fig. 2 is a cross sectional view taken through the appliance as illustrated in Fig. 1, and Fig. 3 is a fragmentary view partly in elevation and partly in section illustrating an educational appliance constructed in accordance with a further embodiment of my invention.

As illustrated in Figs. 1 and 2 of the drawings, my improved educational appliance comprises a body B consisting of two overlying flat plates 1 and 2 having their outer marginal portions connected by the interposed and integral flange or wall 3, whereby the body B is substantially U-shaped in cross section. By this arrangement, the body B may be readily caused to straddle or bridge a marginal portion of a tablet or other support so that the same may be mounted in a convenient manner for use.

The upper plate 1 is provided at its opposite margins with the upstanding ears 4 arranged in longitudinally alined series. The ears 4 of each series are connected by an elongated member 5 such as a wire or the like and which member is threaded through a series of independently rotatable members or disks 6.

The periphery of each of the disks is provided with a plurality of facets 7 and arranged on each of such facets 7 is a symbol 8. The symbol 8 may be of any character desired, such as letters of the alphabet, the various numerals, abbreviations of days of the week, or the like, so that the appliance may be used to advantage in the development of the mind of a child or other person engaged in primary or elementary study and at the same time affording for the user a source of amusement.

In the embodiment of my invention as disclosed in Fig. 3, the members or disks $6^a$ are of a character substantially the same as hereinbefore set forth relative to the members or disks 6, and said members or disks $6^a$ are mounted for independent rotation about an elongated member M. The member M preferably constitutes a tubular metallic element having enlargements or heads 9 and 10 at its opposite end portions and between which the members or disks $6^a$ are arranged. In this particular embodiment of my invention, the head 9 constitutes a conventional type of rubber eraser while the head 10 constitutes a point of the type generally employed in connection with a pencil of the lead feeding type. As the particular construction of the lead feeding mechanism forms no part of my invention, a detail description and illustration thereof are believed to be unnecessary.

From the foregoing description, it is thought to be obvious that an educational appliance constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

An educational appliance comprising two overlying plates connected in spaced relation, opposed marginal portions of one of the plates being provided with a plurality of series of alined outstanding ears, members connecting said ears, and a plurality of disks mounted for independent rotation upon each of said members, each of said disks carrying symbols.

In testimony whereof I hereunto affix my signature in the presence of two witnesses.

LUTHER W. MUSSER.

Witnesses:
HARRY SHAWLEY,
T. D. DECKER.